March 30, 1954 W. R. HOWELL 2,673,694

SELF-WINDING REEL

Filed Aug. 22, 1950 4 Sheets-Sheet 1

INVENTOR
William R. Howell
BY Darby & Darby
ATTORNEYS,

March 30, 1954 W. R. HOWELL 2,673,694

SELF-WINDING REEL

Filed Aug. 22, 1950 4 Sheets-Sheet 2

INVENTOR
William R. Howell
BY Darby & Darby
ATTORNEYS.

INVENTOR
William R. Howell
BY Darby & Darby
ATTORNEYS.

INVENTOR
William R. Howell
BY Dailey & Dailey
ATTORNEYS.

Patented Mar. 30, 1954 2,673,694

UNITED STATES PATENT OFFICE 2,673,694

SELF-WINDING REEL

William R. Howell, Middletown, N. Y., assignor, by mesne assignments, to Eastern Metals Research Co., Inc., New York, N. Y., a corporation of New York Application August 22, 1950, Serial No. 180,735

13 Claims. (Cl. 242—84.9)

This invention relates to a self-reeling mechanism for the storage of long strands or tapes of any flexible material.

This invention is applicable, for example, to long, coiled, measuring tapes of the type used by engineers, architects and surveyors.

The main object of the invention is to provide a mechanism including a tape or strand reel capable of fully rewinding the tape or strand, when released after being extended.

Another object of this invention is to provide a spring-driven return mechanism for tapes of this type, which is capable of retracting the tape into a casing from a fully extended position.

A still further object of the invention is to provide an automatically acting brake for holding the tape or strand in any of the extended positions to which it may be drawn from the casing.

A still further object of the invention is to provide a spring-return drive mechanism for long measuring tapes, and a co-acting brake mechanism for holding the tape in its extended position and for permitting its full return into the casing when released.

Other and more detailed objects of the invention will be apparent from the following description and the embodiment thereof illustrated in the drawings.

In the accompanying drawings.

Figures 1, 2:
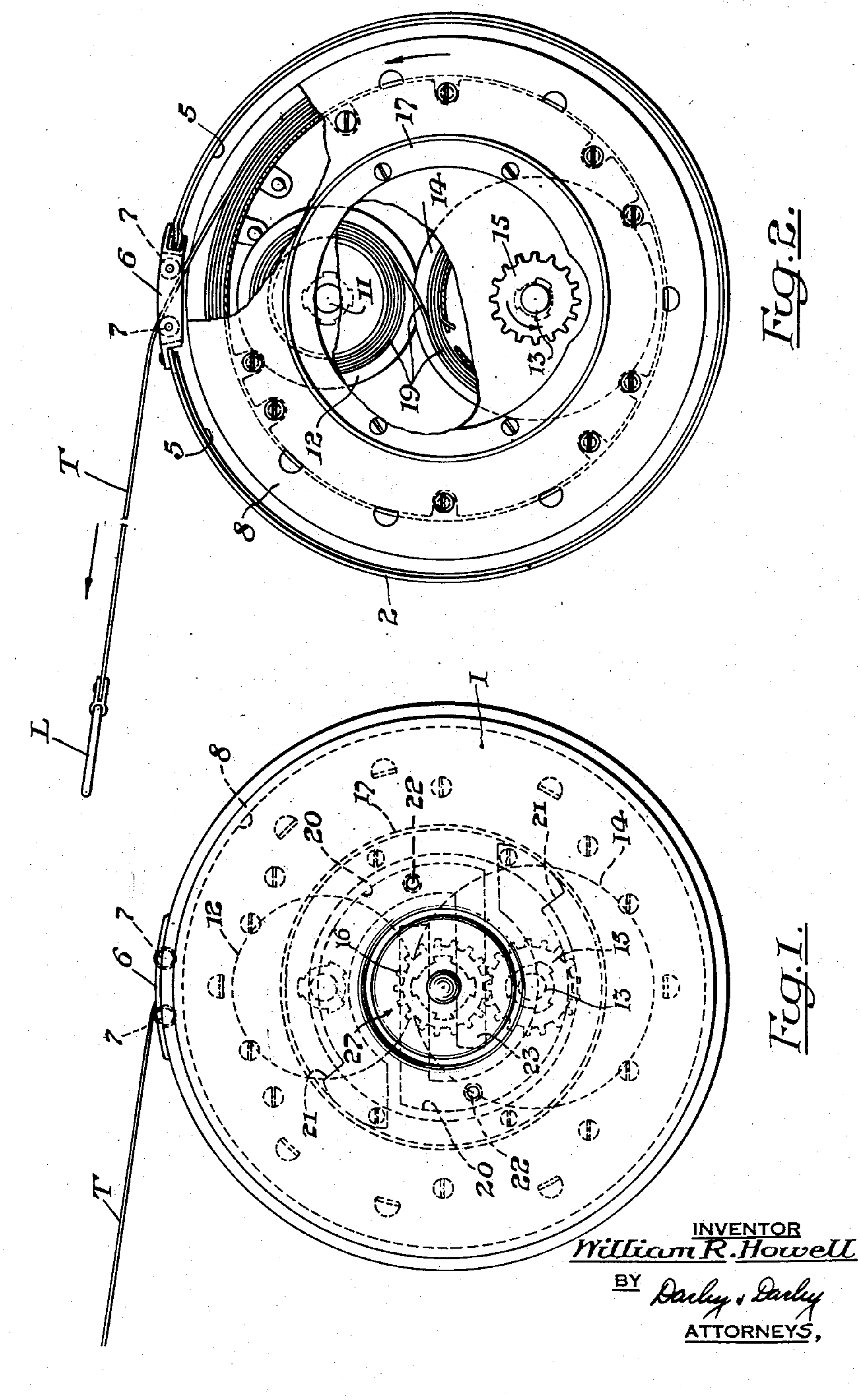
Figure 1 is a plan view of the housing of the device of this invention showing some of the parts within the casing in dotted lines.
Figure 2 is a similar view from the same position with the top half of the casing removed and with a portion of the tape reel broken away.

This invention will be described in the form of a measuring tape. Measuring tapes, as used by engineers, architects and surveyors, are usually made in relatively long lengths, as for example, 25, 50, 75, 100 foot and longer. As is well known in this art, such a tape, as manufactured, is almost universally of the type which must be rewound by hand to draw the graduated blade back into the tape housing. This is a time consuming and boring operation, especially for those who have large use for such tapes, because of the necessity of frequently withdrawing the blade from the casing and manually rewinding it back into the casing. It is, of course, common in the measuring tape art to provide spring-operated return mechanism for retracting the graduated blades of relatively short length back into the casing. For example, carpenters' and mechanics' tapes of this type, which usually come in lengths of 6, 8, 10 and 12 feet, are commonly provided with spring-driven return mechanism.

It has not been practical to provide spring-return mechanism for the longer tapes referred to above because of the difficulty of providing a spring drive having a constant pull, due to the fact that the force exerted by a spring varies widely with its elongation or distortion. Even in the case of the carpenter's tape, it is a fact that, when the tape is fully extended, the retracting force is much greater than needed, and as the tape approaches fully retracted position, the spring frequently has not force enough, due to the wide variation in force, to fully retract the tape into its casing. Thus, in the case of the carpenter's tape, it will start back into the casing with great speed but will gradually slow down as the spring returns to normal or relaxed position. Due to the wide variation in spring force, it has not been possible, within practical limits, to provide a long graduated tape with a spring return.

The central idea of this invention consists in the conception of the use of a spring drive of the type disclosed in United States Patent No. 2,063,799, granted December 8, 1936 to A. F. Fornelius et al., in a combination whereby long measuring tapes may be spring-returned to the casing. An important feature of this combination is that the force required to withdraw the graduated blade from the casing remains substantially uniform and likewise the force produced by the spring-return drive remains substantially constant.

A further advantage of this combination is the fact that a practical spring-return drive may be provided which is capable of providing the relatively wide range of movement required in withdrawing and returning long graduated blades.

The embodiment of the invention disclosed in the drawings is adapted for a wide range of tape lengths of the order indicated above. As illustrated, it consists of a casing made up of two complementary housing sections each in the form of a circular flanged disc, arranged in juxta-opposed position. For the sake of clarity, the housing portion 1 will be called the bottom of the housing and the portion 2 will be called the top.

Figures 9, 10, 11, 12, 13:
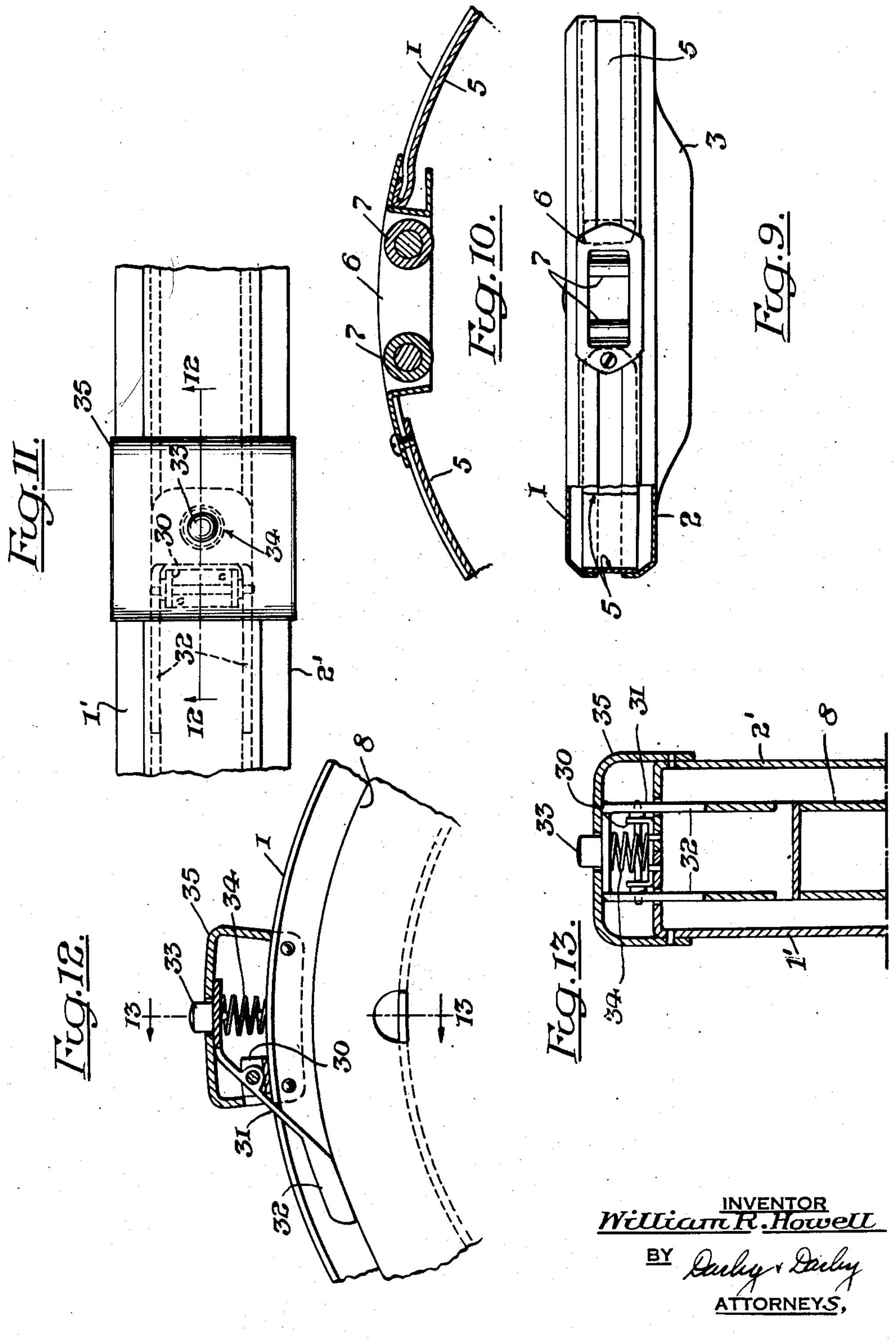
Figure 9 is an edge elevational view of the tape housing showing the gate assembly with a portion of the housing broken away.
Figure 10 is a longitudinal cross-sectional view through a portion of the housing and the gate assembly.
Figure 11 is an enlarged detail plan view of the casing 4 and the actuating part of a modified form of brake.
Figure 12 is a cross-sectional view taken on the line 12—12 of Figure 11.
Figure 13 is a cross-sectional view taken on the line 13—13 of Figure 12.

As indicated in Figure 9, each housing portion is essentially a disc with an annular flange. These flanges do not contact when assembled. The circular terminal edges of the flanges lie in parallel spaced planes and an inner ring 5 extending around the periphery thereof closes the space between them. An outer trim or dress strip, not shown, overlies these flanges, extending around the periphery thereof, to produce a finished appearance. These parts are constructed to provide an opening for a gate assembly 6 in which a pair of anti-friction rollers 7 are journalled to facilitate the movement of the tape through the gate. The gate assembly is attached to the housing parts in any suitable manner. At this particular point, it may be noted that this invention is not concerned with the details of the housing and gate construction, as they may be widely varied.

Figures 6, 7, 8:
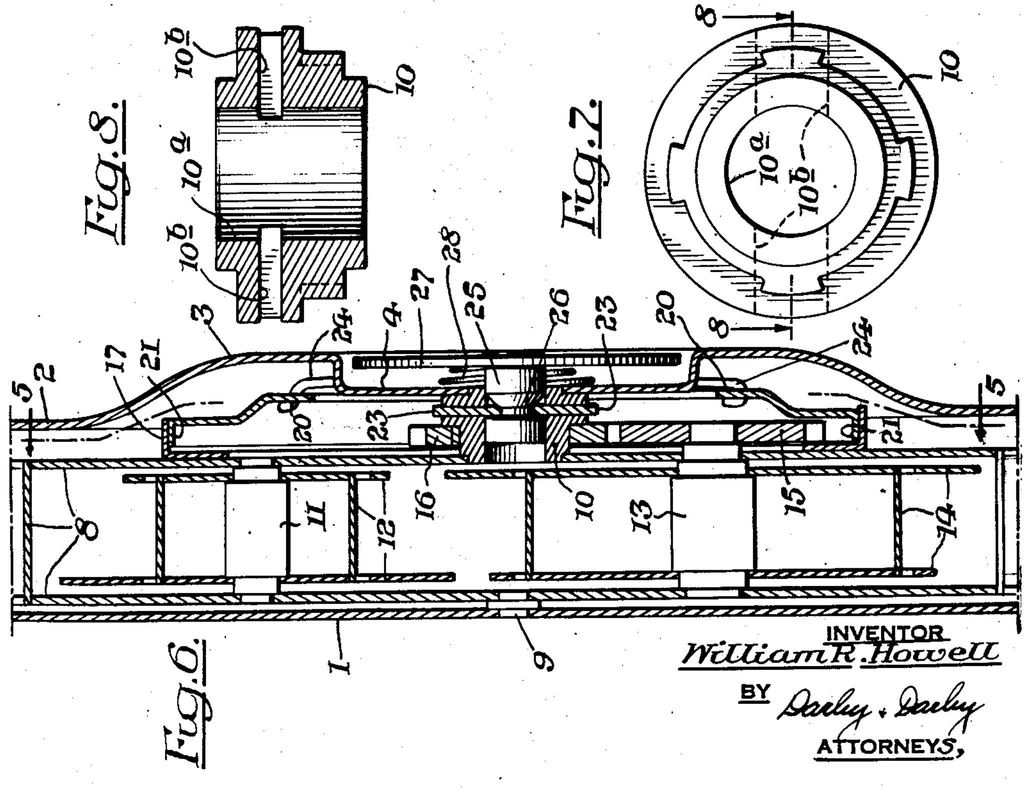
Figure 6 is a transverse, central, enlarged, cross-sectional view on the line 6—6 of Figure 5 showing the relationship of the parts within the housing.
Figure 7 is a plan view of one of the supports for the tape drum, the sun pinion and the brake operating member.
Figure 8 is a cross-sectional view taken on the line 8—8 of Figure 7.

The top portion 2 of the casing is dished outwardly, forming a circular enlargement 3, to provide space for some of the operating mechanism, as indicated in Figure 6. The central portion of the enlargement 3 is reversely recessed at 4, Figure 6, to provide a cavity for the brake operating disc, which lies flush with or within the outline of the enlargement 3.

Figure 4:
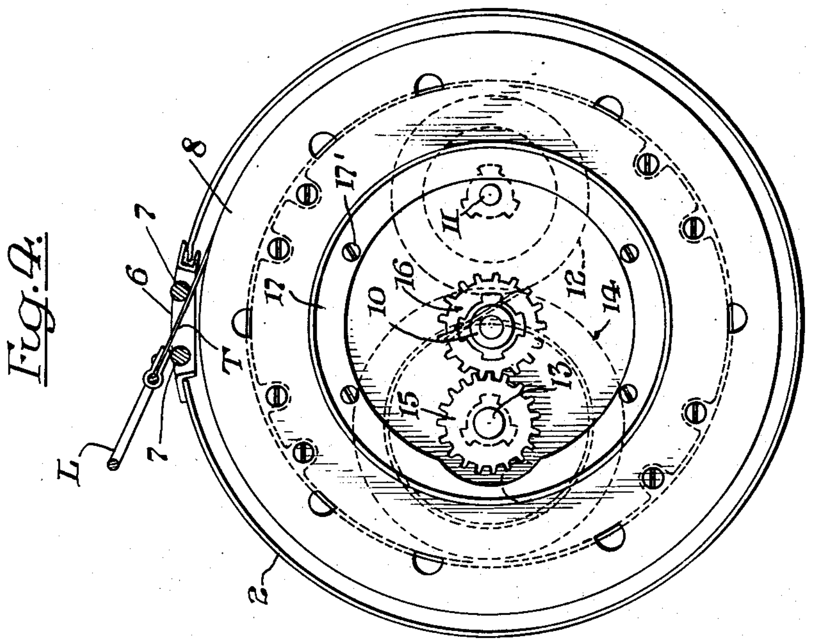
Figure 4 is a view similar to Figure 2 showing some additional parts.
Figure 3:
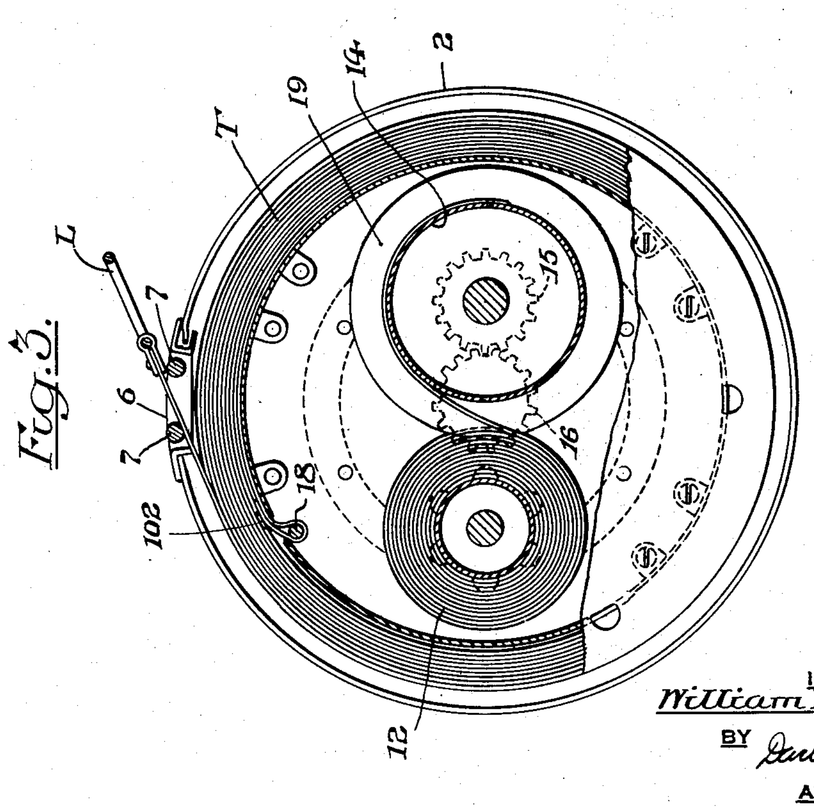
Figure 3 is a view similar to that of Figure 2 showing a portion of the tape reel in cross-section and showing the return-spring drum in cross-section.

Within the enclosure, thus formed, is the tape reel 8 having an external diameter approximating the internal diameter of the housing, as will be seen from Figures 3 and 4. The details of construction of this reel form no part of this invention, although it may be mentioned, as indicated in the drawings, that it is made up of stampings consisting of a pair of discs and a connecting strip forming the bottom of a circular trough, in which the graduated tape T is coiled. As illustrated, this tape is provided with the usual loop or finger piece L at its terminal end and, as shown in Figure 3, the inner end of the tape is attached to the reel by means of a stud 18. The reel 8 is journalled on the bottom housing portion 1 and centrally thereof by means of a suitable pivot pin 9 secured in any suitable manner to the reel or housing. The other side of the reel is journalled on a bored stud 10. A small drum 12 is in turn journalled on a shaft 11 mounted between the discs of the reel 8, as clearly shown in Figure 6. A larger drum 14 is similarly mounted on shaft 13. These drums can likewise be constructed in any suitable manner, as, for example, as illustrated, from stampings, and assembled in any suitable manner.

As illustrated, the oppositely disposed side discs of the drums 14 and 12 are of greater diameter than their companion discs so as to provide a guided pathway for the spring and coacts therewith, as will be described later. It should be noted that the drum 12 is freely rotatable on the shaft 11 but that the drum 14 is secured to the shaft 13, the right hand end of which (Figure 6) projects through the side disc of the reel 8 and has attached thereto a planet pinion 15. The planet pinion meshes with sun pinion 16 secured to the bored stud 10, which in turn is secured at its other end to the wall forming the bottom of the recess 4. The stud 10 does not revolve, and, as the sun gear 16 is fixed to it, it likewise is stationary.

Secured to the right side of the reel 8 (Figure 6) is a flanged ring 17 forming a brake drum. This brake drum is secured to the reel in any suitable manner, as by means of screws 17'.

A pre-set spring 19, see Figure 2, has one end attached to drum 14, and the other end attached to drum 12. This spring is prestressed so that when it is relaxed it naturally coils up on drum 12. As it is uncoiled from this drum, as will be explained later, it is coiled up on the drum 14. It will be noted in coiling up on the drum 14 it is stressed or flexed in a reverse direction in relation to its normal relaxed condition with the result that a return driving power is provided to cause it to naturally tend to reel itself back onto drum 12. This spring is in the form of a long ribbon and its length can be varied to provide, in relation to the mechanical advantage provided by the two drum sizes, all the motion necessary to permit the required movement to fully withdraw the tape from the housing.

Figure 5:
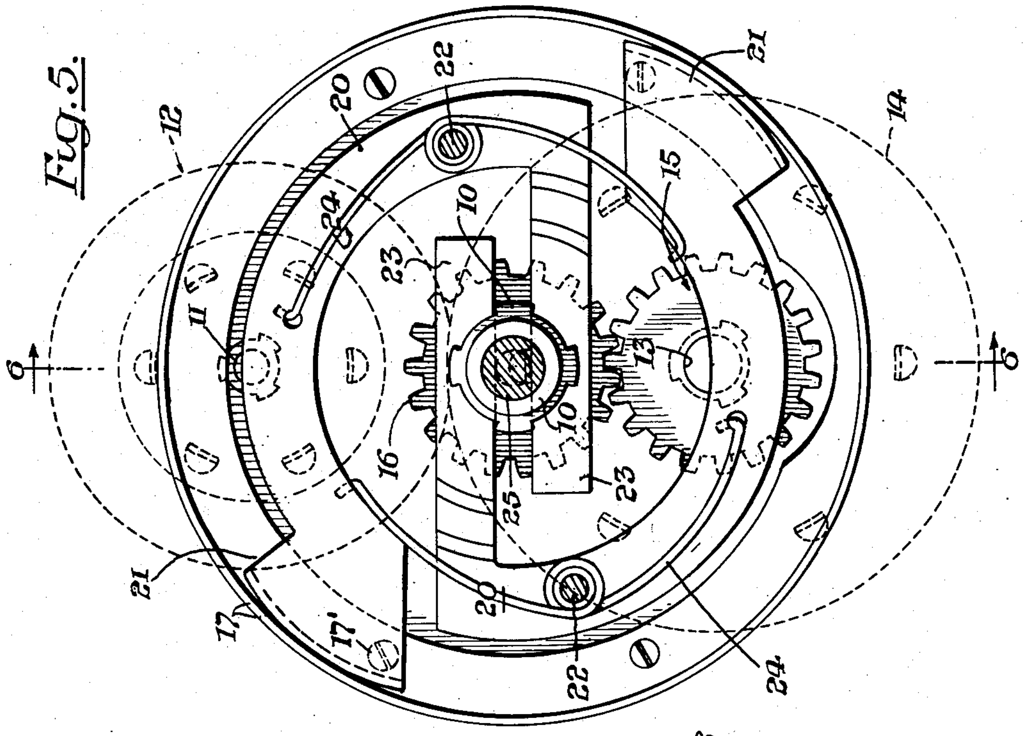
Figure 5 is an enlarged detail view of the brake mechanism for the tape reel viewed from the plane 5—5 of Figure 6.

The top portion 2 of the casing is provided on its inner face, in the region of the enlargement 3, with a pair of pivot studs 22, see Figure 5, on which are pivotally mounted a pair of arcuate braking arms 20. The outer ends of these arms are provided with axial extensions 21 having arcuate faces, forming brake shoes, which bear on the inner face of the flange of the brake drum 17. A pair of springs 24 are wrapped around the pivot studs 22 so that the free ends thereof extend in divergent directions. One end of each spring 24 is bent into a hook to fit over the edge of the brake arms 20, as shown. The other end of each spring is provided with a right angle extension which rests in an aperture in the wall of the recess 4. It will be noted that these springs are stressed so as to urge shoes 21 of the brake arms 20 outwardly in a generally radial direction so as to normally bear on the brake drum, as shown. The other ends of the brake arms 20 provide generally right angled extensions 23, which extend in parallel spaced relation with respect to each other and lie in radial slots $10^b$ in the stud 10. These slots intercept the bore 10 of the stud so that adjacent edges of the extensions 23 project into the bore, as clearly shown in Figure 5. These extensions are normally seated against the inner ends of the slots $10^b$, see Figures 5 and 6.

Axially slidable in the bore $10^a$ of the stud is cylindrical pin 25 that is secured to a disc 27, which provides an operating button or actuator to effect brake release. The disc 27 lies within the recess 4, as clearly shown in Figure 6. A spiral spring 28 surrounds the pin 25 and lies between the bottom of the recess 4 and the inner face of the disc 27. The pin 25 is provided with an annular groove, one side of which is frusto-conical, as indicated at 26. It will be noted that the right angled side of the recess engages the extensions 23, of the brake arms, and limits the outward movement of pin 25 and disc 27, under the action of spring 28. In this position of the parts, the brake shoes engage the drum 17. When the disc or button 27 is pushed inwardly, the cam surface 26 separates the extensions 23 causing counterclockwise rotation of brake arms 20, Figure 5, to disengage the brake shoes 21 from the brake drum 27. As soon as disc 27 is released, springs 24 and spring 28 act respectively to engage the brake shoes with the brake drum and return the pin 25 and button 27 to normal position, as shown in Figure 6.

In the operation of the device the user pushes inwardly on the button or disc 27, which he can do by gripping the casing so that the button can be pushed by thumb or finger. This pushes the pin 25 inwardly so that the camming surface 26 moves between the brake arm extensions 23 separating them to release the brake, as mentioned above. The tape is then withdrawn from the housing by grasping the loop L and pulling on it. This causes the reel 8 to revolve on its center, causing the drums 12 and 14 to have a bodily rotation or planetary movement about the axis of the reel. By reason of this movement the drum 14 rotates on its axis. This follows because the pinion 15 connected to the same shaft as drum 14 meshes with the fixed sun pinion 16 and therefore rolls around it. This rotation of drum 14 causes it to withdraw the spring 19 from drum 12 upon which it is normally coiled onto itself. As is clear from Figure 2, as the spring 19 uncoils from drum 12 and coils up on drum 14, it is reversely flexed in the region between the two drums. To explain it another way, referring to Figure 2, spring 19 is pre-set so as to normally coil around the drum 12 in a clockwise direction. As it is withdrawn from this drum and wound onto drum 14, it is flexed opposite to its pre-set condition.

Each time the user releases the tape T in order to get a new hold on it to withdraw another length, he releases his pressure on the button 27 so that the brake is reapplied and holds the reel against movement. When the user wishes to recoil the tape T he again presses on disc 27 releasing the brake. The tendency of the spring 19 to recoil itself back onto the storage drum 12 causes the reel 8 to revolve in the reverse direction. The energy to effect re-reeling of the tape results first from the fact that the tape is pre-set so as to tend to wrap itself around the storage drum 12 if left free. Secondly, the reverse flexing of the spring between its points of tangency with each of the drums supplies energy in its effort to return to its pre-set shape. Thus, when the brake is released, and any of the tape T extends from the casing, the spring 19 will act to rotate the drum 8 in a direction to coil the tape T back on it. As the spring 19 recoils itself on drum 12 it causes drum 14 to revolve, carrying with it of course pinion 15. This movement of pinion 15 causes it to roll around the fixed sun pinion 16 and as a result reel 8 revolves in a wind-up direction to recoil the tape.

It will be seen that by properly proportioning the parts, and particularly the drums 12 and 14 and reel 8, and by providing a spring 19 of the proper length, it is possible to effect re-reeling of tapes of widely varying lengths.

In the application of this invention to measuring tapes it is apparent that the necessity of rewinding the tape at the end of each use is avoided.

A modified form of brake is shown in Figures 11, 12 and 13 in which the brake shoe acts directly on the tape reel 8. As shown, a bracket 30 is secured to the casing and pivotally mounted thereon is a brake arm 31 having a brake shoe end 32. The brake shoe end is U-shaped, as shown in Figure 13, and arranged so that the edges thereof engage the side discs of the reel 8 at their peripheries. A spring 34 is positioned between the other end of the brake arm 31 and the housing to normally engage the brake shoes with the reel. An operating button 33 is secured to this end of the brake arm and a protective housing 35 fits around the actuating end of the brake arm and is secured to the casing in any suitable manner. As will be apparent when the button is depressed, the brake shoes 32 will disengage the reel and whenever it is released the brake will be applied.

Figure 15:
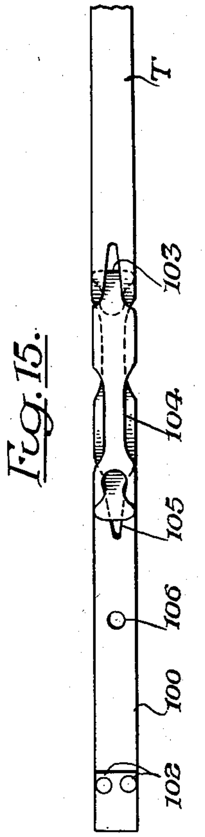
Figures 14 and 15 are elevation and plan views of the tape leader showing a detachable connection to the inner end of the graduated tape.
Figure 14:
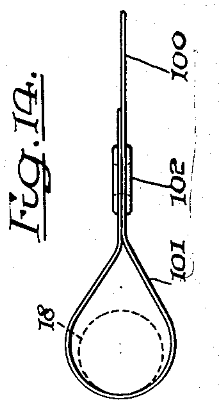

In the measuring tape application of this invention, it is desirable to provide a structure which facilitates changing of the graduated tape should it be broken or damaged in use. The structure for this purpose is illustrated in Figures 14 and 15. A connecting leader 100 is provided consisting of a strip of metal folded over on one end and riveted down by the eyelets 102 to provide a loop 101 to be mounted on the anchoring pin 18 shown in Figure 3. As shown in Figure 15, this leader is provided with a tip 103 resulting from cutouts from the strip 100, necking down the strip to form a head or tip. The tail end of the leader is connected with the main body of the strip by a section 104 of reduced width adjacent which is an elongated opening 105. Between this opening and the looped end 101 is an aperture 106. As is clear from Figure 15, the inner end of the graduated tape 19 is similarly shaped with regard to the tip 103, the necked down portion 104 and the aperture 105, so that they can be detachably secured together as shown in this figure. In order to replace a damaged or broken tape, it is fully withdrawn from the housing until the leader projects therefrom to expose the aperture 106. A match, nail or the like is dropped in the aperture 106 so that the loaded spring 19 cannot inadvertently retract the leader 100 into the housing. The broken end of the tape is then disengaged from the leader 100 and a new tape attached to replace it. During this time the match or nail in the aperture 106 prevents inadvertent retraction of the leader into the housing under force of spring 119. This provides a simple arrangement for making it possible to replace a damaged or broken blade in the case of a measuring tape and similar applications of this invention.

As the subject matter of this invention may be used to rewind ribbons, tapes, wire, rope, etc., of all types regardless of their use, it is apparent that I do not intend to limit this invention to measuring tapes. The term "tape" in the claims is intended to include all kinds and shapes of strands and ribbons.

What is claimed is:

1. In a reeling device, the combination comprising a support, a tape reel rotatably mounted on said support, a pair of drums rotatably mounted on said reel, a pre-set spring normally wound on one of said drums and connected at its ends to said drums respectively, a planet pinion rotatable with one of said drums, a sun pinion fixed on said support and meshing with said planet pinion, a tape coiled on said reel, and means for attaching the inner end of said tape to said reel.

2. In the combination of claim 1, said spring being attached to said drums so that opposite faces at the ends thereof contact said drums at the points of connection of the spring to said drums.

3. In the combination of claim 1, said spring being reversely flexed as it is being wound onto said other drum.

4. In the combination of claim 1, said spring being pre-set to normally tend to coil on itself.

5. In the combination of claim 1, a brake device comprising a braking surface on said reel, a brake arm pivotally mounted on said support, resilient means for normally causing said brake arm to engage said braking surface, and means mounted on said support for causing said brake arm to disengage said braking surface.

6. In the combination of claim 1, a brake comprising a brake drum attached to said reel, a brake arm pivotally mounted on said support, resilient means for normally causing said brake arm to engage said brake drum, and means mounted on said support for moving said brake arm out of engagement with said brake drum.

7. In the combination of claim 1, a brake comprising a brake drum attached to said reel, a brake arm pivotally mounted on said support, resilient means for normally causing said brake arm to engage said brake drum, and a slidable brake release member having a camming surface engaging said brake arm to release said brake.

8. In the combination of claim 1, said support comprising a casing having an aperture through which said tape can move.

9. In the combination of claim 1, a brake device comprising an arm pivotally mounted on said support in a position to engage said reel, and resilient means for normally causing said arm to engage said reel.

10. In the combination of claim 1, said tape reel having a radius at least as great as the radius of rotation of said planet pinion.

11. In the combination of claim 1, said support comprising a housing for the reeling device, a brake device comprising an arm pivotally mounted on said support in a position to engage said reel, resilient means for normally causing said arm to engage said reel, and means including a member exterior of said housing movable axially to engage said arm to move it from braking position.

12. In the combination of claim 1, said support comprising a housing for the reeling device, a brake device comprising an arm pivotally mounted on said support in a position to engage said reel, resilient means for normally causing said arm to engage said reel, and means including a member exterior of said housing movable axially to engage said arm to move it from braking position, said housing being formed with a recess in which said member lies flush.

13. In the combination of claim 1, said support comprising a housing for the reeling device, a brake device comprising an arm pivotally mounted on said support in a position to engage said reel, resilient means for normally causing said arm to engage said reel, means including a member exterior of said housing movable axially to engage said arm to move it from braking position, and means for normally holding said member out of engagement with said arm.

WILLIAM R. HOWELL.

References Cited in the file of this patent

UNITED STATES PATENTS

| Number | Name | Date |
|---|---|---|
| 583,830 | Wiley | June 1, 1897 |
| 959,750 | Joseph | May 31, 1910 |
| 1,945,842 | Witchger | Feb. 6, 1934 |
| 2,063,799 | Fornelius et al. | Dec. 8, 1936 |
| 2,476,878 | Kraft | July 19, 1949 |
| 2,510,939 | Carlson | June 6, 1950 |